May 19, 1970 A. MIGULE ET AL 3,513,090
FILTERING APPARATUS AND METHOD
Filed Dec. 14, 1966 3 Sheets-Sheet 3
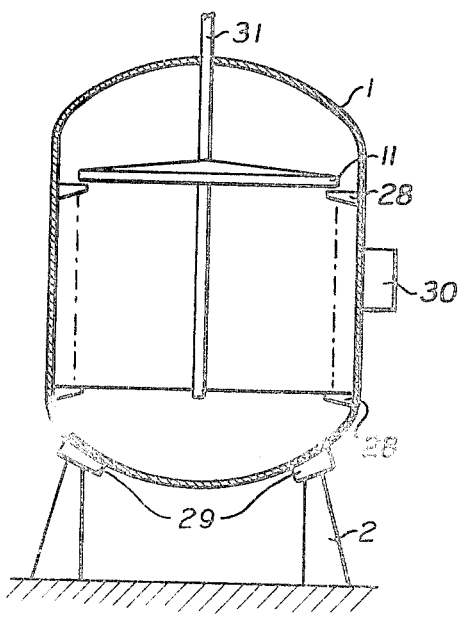
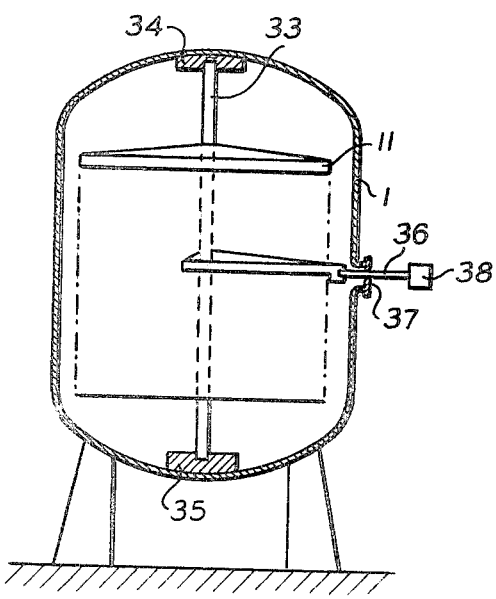
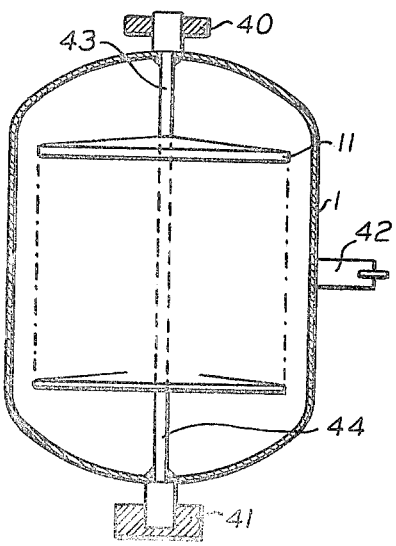
INVENTORS
ALBRECHT MIGULE
BY HANS BURDE
Burgess, Dinklage & Sprung
ATTORNEYS.

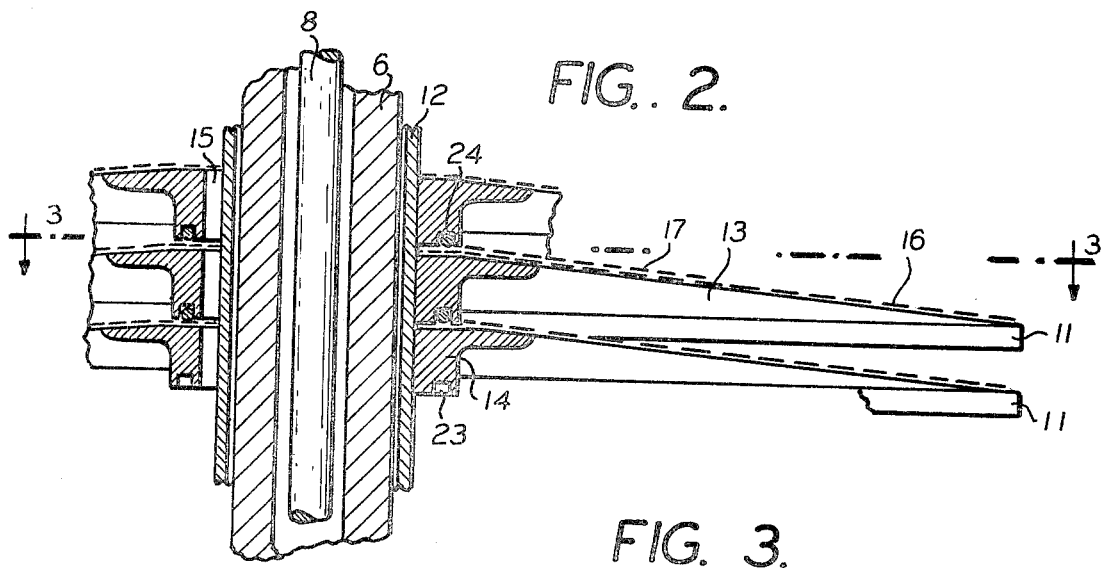
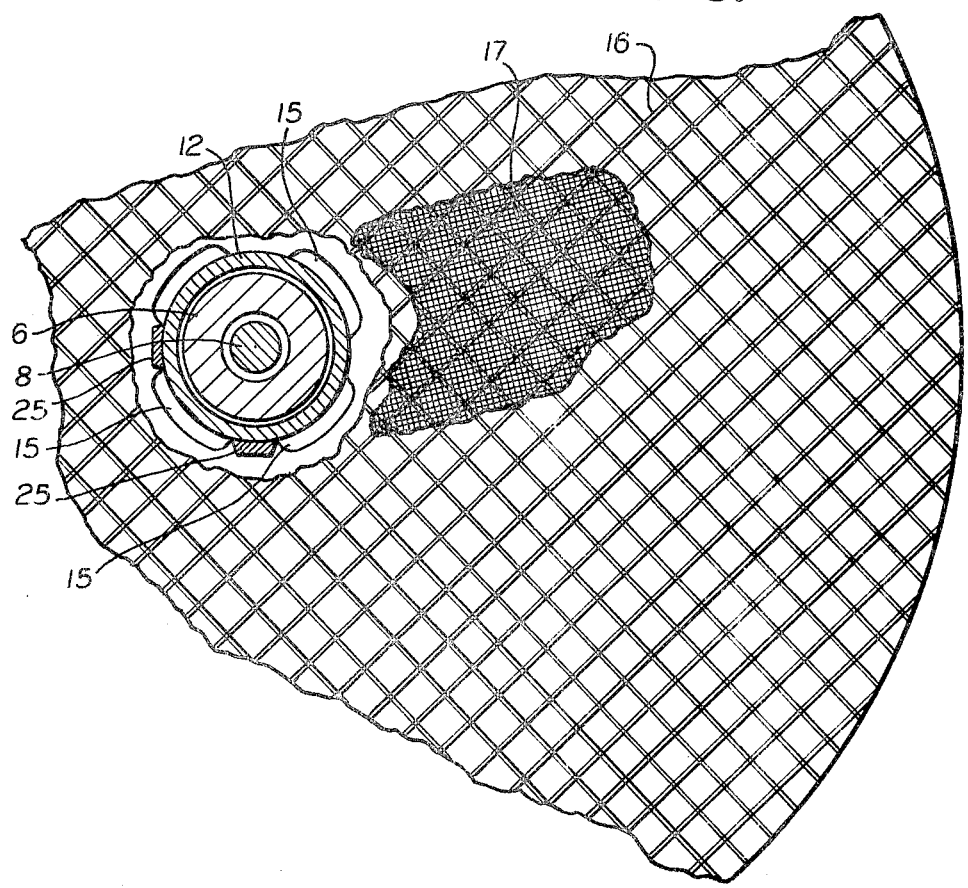

United States Patent Office 3,513,090
Patented May 19, 1970

3,513,090
FILTERING APPARATUS AND METHOD
Albrecht Migule, 1 Maierbruckallee, Tiengen, Germany, and Hans Burde, 16 Iserlohner Strasse, Kalthof uber Schwerte, Germany
Filed Dec. 14, 1966, Ser. No. 601,772
Claims priority, application Germany, Mar. 9, 1966, M 68,691
Int. Cl. B01d 35/20, 25/34
U.S. Cl. 210—19
18 Claims

ABSTRACT OF THE DISCLOSURE

Filtering apparatus and method of using the same including a casing, at least one filter plate within the casing, inlet means sealingly passing through said casing, outlet means sealingly passing through said casing on the other side of the filter plate, and means for rotationally oscillating the filter plate without breaking the sealing between the outlet means and the casing.

---

This invention relates to filtration devices. It more particularly refers to plate and frame type filters operated on the basis of a pressure differential on either side of the filter.

This disclosure describes a filtration process and the apparatus in which such process is carried out. Means are provided in the filtering apparatus to rotationally oscillate the filter plate so as to dislodge filtered material therefrom.

Plate and frame filters are very well known. Equipment is generally available in which such filters can be operated under pressure and/or vacuum conditions which exceed the pressure differential applied merely as a consequence of the fluid head of the filtered medium. Such pressure and/or vacuum filters are often constructed as a tank or casing which is pressure-tight and a rod or shaft having one or more filter plates attached thereto inside the casing. Suitable inlet and outlet connections are provided as well as means for passing the filtrate through the filter plate and thence to the outlet without interfering with filtration of fresh medium to be filtered or with the excess pressure differential.

In filtering apparatus, after the filter cake that forms on the filter has reached a certain thickness, it is necessary or desirable to remove it from the filter. The manual removal of the filter cake is not only a difficult and time-consuming job, but in many cases, it is impossible, as for example, in the case of toxic, radioactive, explosive or perishable substances, or when an overpressure or vacuum has to be maintained in the filter apparatus during removal of the filtered matter from the filter plates.

Filtering apparatus are known in which the filter cake is removed mechanically in that the filter plates are set in rotation, so that the filter cake is thrown off by centrifugal force. In such apparatus, however, the drive shaft has to be introduced into the filter casing through a stuffing box. If a high overpressure or a good vacuum has to be sustained in the filter apparatus, considerable difficulties are created by such stuffing boxes. If the internal pressure exceeds about 10 atmospheres, it is technically impossible to pass moving parts such as drive shafts through the casing wall by means of stuffing boxes. Likewise, it is very difficult to make a stuffing box so airtight that small amounts of air might not leak in, which under certain circumstances can be extremely harmful, especially in the case of substances which must not come into contact with oxygen. Such seals also have the disadvantage that they produce attrition by which the substances are contaminated.

It is in the prior art to remove the filter cake by reverse flushing, but this method has disadvantages: in particular, the filter cake is not removed uniformly, and the solids are mixed with considerable amounts of the reverse flushing liquid, and must be reseparated therefrom.

Accordingly, the problem is to mechanically remove the filter cake uniformly and completely from the filter plate or plates in pressure or vacuum filters of this kind, and to do so without opening the casing or passing movable parts, such as drive shafts, through the casing wall by means of stuffing boxes, and without the additional use of reverse flushing liquid.

It is therefore an object of this invention to provide novel mechanical means of removing filtered matter from a filter cake.

It is another object of this invention to provide a filter cake removal system for use in high pressure differential filtering systems.

It is a further object of this invention to provide a means of dislodging filter cake from a filter within a high pressure differential filtering system without the introduction of moving parts through the filtering apparatus casing.

Other and additional objects of this invention will become apparent from a consideration of this entire specification, including the claims and drawings appended hereto.

In accord with and fulfilling these objects, this invention comprises, in one of its aspects, the use of vibratory forces upon the filter plates to dislodge the filtered matter from its repository thereon. It has been found that vibratory forces can be introduced into operative association with the filter plate or plates alone or in combination with the filter casing, if desired, without in any way imparting a point or points of potential leakage to the casing or the inlets or outlets therein.

Rotational oscillations produce not only centrifugal forces, but also high acceleration and deceleration forces in the tangential direction, so that a filter cake lying on filter plates which perform such rotational oscillations rapidly loses its interior cohesion and cohesion with the filter and is hurled outward.

The rotational oscillations of the filter plate can be produced by fastening the plates to a common central shaft which is carried through the casing wall without contact with either the filtrate or the medium to be filtered, if necessary, and is externally driven. In this case, the filter cake is indeed removed rapidly and reliably from the filter plates. Care must be taken, however, to insure avoidance of joints where leaks and attrition can develop. One particularly desirable construction which is admirably suited to use in situations where the amplitude of the rotational oscillation is not too great, is to pass a shaft through the casing wall in fixed relation thereto through the use of an elastically deformable separating means.

Producing the rational oscillation of the filter plates can also be accomplished by rigidly connecting the filter plates to the housing, for example, by fastening them by yokes to the casing wall at their outer periphery, while the entire system consisting of the casing and the filters installed in the casing is mounted and set into rotational oscillation. In this manner, a relatively simple construction of the entire system is assured, but a relatively large mass has to be set into rotational oscillations.

It is nevertheless quite possible to set the filter plates inside of the casing into rotational oscillations by connecting the filter plates with the casing rotatably, and especially rotatably against an elastic force, and by oscillating them by means of force introduced from outside the casing. In the case of an elastic coupling of the filter plates to the casing, it is especially expedient to design the system in such a manner that the oscillating system consisting of the filter plates and their supporting member within the housing have a nodal point at the place at which it is connected to the casing wall or is passed through the casing wall, and therefore can be rigidly fastened to the casing wall, by welding for example.

A system may be located inside of the casing to perform the rotational oscillation connected to the casing by an elastic member that can perform torsional vibrations. This elastic member can be a rod or a pipe and the oscillations can be produced by setting the casing into such oscillation that the frequency corresponds to the natural frequency of the oscillatory system within the casing. In this situation, the casing and the oscillating system disposed within the casing will perform rotational oscillations in contrary directions. The rotational oscillations of the casing can be forced vibrations, or the casing may be mounted or suspended elastically so as to perform natural vibrations at its inherent frequency, such that the casing and the inner oscillating system form a system capable of natural vibrations.

If a rod or tube that is sealed off from the vessel interior is used as the elastic member to which the oscillatory system is fastened within the casing, the rotational oscillations can be introduced from outside the casing by the use of an apparatus in which the filter plates are fastened to the free end of this elastic member and a rod is disposed coaxially in the member, one end of said rod being fastened to the free end of the member and the other end to an oscillatory drive.

In all cases in which the inner system is excited to rotational oscillations with the use of elastic members, it is especially advantageous if the excitation of the oscillations takes place at a frequency which at least approximately corresponds to the natural frequency of the oscillating system when the filter plate is loaded with a filter cake or when the filter plates are loaded with filter cakes, as the case may be. In this case, when the filter plates are loaded, resonance exists between the natural oscillation and the exciting oscillation, i.e., the filter plates perform very powerful oscillations by which the filter cake is rapidly thrown off. But as soon as the filter plates are no longer loaded with the filter cake and therefore has a considerably higher natural frequency, resonance no longer exists and the amplitude of the oscillations decreases considerably, thereby insuring that the elastic coupling members are highly stressed for only a short time until the filter cakes are thrown off, whereupon the oscillatory drive can be shut off. The oscillatory drive may be controlled automatically or by hand.

In order to achieve the largest possible filter area, it is common for filters of the type described herein to utilize a plurality of filter plates instead of a single filter plate. In this case, it is expedient to fasten the filter plates together in a rigid stack, so that the entire stack constitutes the mass performing the rotational oscillations, and to connect this stack to the free end of the elastic member.

In order to reinforce the dislodging effect of the rotational oscillations on the filter cake, it is furthermore expedient to provide conical-shaped filter plates, rather than to have them flat in shape. In this regard, a moderate slant downward and outward amounting to about 2 degrees to 10 degrees, and preferably to 5 degrees, has been found to be sufficient for most purposes. According to the purpose for which the filter is used, or according to whether the filter cake is easy to dislodge or tends to stick, this angle can be made larger or smaller.

As the rotational oscillation driving means, any conventional generator of oscillations can be used, especially a mechanical drive or a magnetic vibrator.

In the preferred embodiment of the apparatus, in which the oscillations of the filter plate, or of the filter plate stack, are produced by an independent driving means, a force of reaction is produced, by which the casing of the filtering apparatus can also be set into oscillation. Therefore, it has proven expedient to mount or suspend the casing elastically, so that the casing as a whole also performs oscillations, i.e., vibrates. When operating in this manner, it has been found that, if pieces of the filter cake are thrown off of the filter plates onto the casing wall, they slide down the housing wall and the entire mass of the filter cake collects in the bottom part of the casing.

Understanding of this invention will be facilitated by reference to the accompanying drawings, in which:

FIG. 2 is a sectional elevation of a portion of the filtering device shown in FIG. 1 enlarged in size, with parts broken away;

FIG. 3 is a plan view taken along the line 3—3 in FIG. 2, as if FIG. 2 was not in section, with parts broken away;

FIG. 4 is a schematic view in elevation of an alternate filtering device according to this invention;

FIG. 5 is a schematic view in elevation of an alternate filtering device according to this invention; and FIG. 6 is a schematic view in elevation of an alternate filtering device according to this invention.

Figure 1:
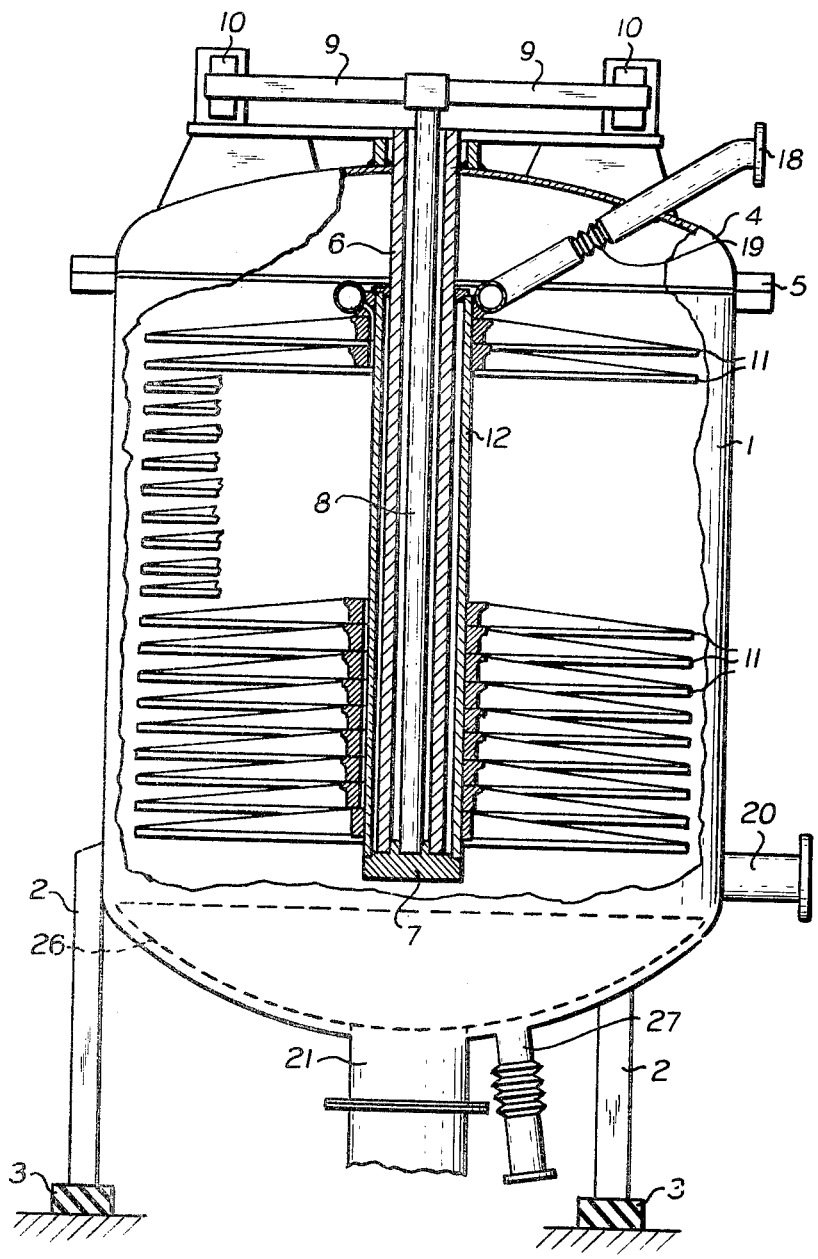
FIG. 1 is an elevation partially in section of a filtering device according to this invention.

This invention will now be described with particular reference to these drawings.

The filter apparatus represented in FIG. 1 consists of a casing 1, which is supported on legs 2 resting on elastic pads 3, such as rubber cushions. A cover 4 is sealingly mounted on the casing 1, for example by means of flange fastening means 5. A pipe 6 is provided with its upper end fastened to the cover; since the pipe 6 is not movable with respect to the cover, it is possible to fasten the pipe 6 to the cover 4 in such a manner as to assure a gas-tight and liquid-tight seal even at high temperatures and pressures, for example by welding or brazing the pipe to the cover.

The pipe 6 consists of an elastic material, such as steel or brass, and its length and wall thickness is such that it can twist elastically, thereby supplying the restoring force necessary for the production of rotational oscillations. At its bottom end, the pipe 6 is closed by a sealing inserted, e.g., welded or brazed, cap 7. The bottom end of a rod 8 is rigidly affixed to the cap 7 such that the connection therebetween cannot be broken by the rotational oscillations, even at high stress. It is practical to weld or bolt this cap onto the rod, for example, with a square or hexagonal fitting, and wedged tight. The upper end of rod 8 extending out of the cover 4 is fastened to a cross-bar 9 whose two arms are excited with an appropriate frequency. These oscillations are transferred through the rod 8 to the bottom end 7 of pipe 6. Rod 8 consists of a material that is resistant to torsion.

The actual filtering apparatus consists of filter plates 11 which are set one over the other in a stack and fastened to a supporting tube 12 whose bottom end is rigidly affixed to the cap 7, which seals the bottom of the pipe 6. The filter plates consist, as represented in FIG. 2, of the shallowly conical sheet metal plates 13. Each metal plate has a center piece 14 which is fastened to the tube 12, for example, by means of wedges 25. These center pieces 14 also have recesses 15, so that a channel is provided between the tube 12 and the adjacent center pieces. The sheet metal plate 13 is overlaid in a conventional manner with a supporting fabric 16, which consists, for example, of a closely woven wire fabric, and on this supporting fabric, there lies the actual filter 17.

A tube 18 is furthermore attached to the upper end of the stack formed of the filter plates 11 in such a manner that gas or liquid can be aspirated from the channel between the tube 12 and the filter stack. The tube 18 is passed sealingly through cover 4, being for example welded therein, and contains an elastic intermediate piece 19, so that the oscillations of the filter stack are not hampered or impaired by this tube. So as to prevent any liquid from passing unfiltered between the center pieces into the passages formed by the recesses 15, it is expedient to provide on the bottom of each center piece 14 an annular groove 23 into which a sealing ring 24 is inserted, which simultaneously clamps the supporting fabric 16 and the filter 17 of the filter plate beneath it.

The actual filtering process is performed in the described apparatus in the conventional manner. After the vessel has been tightly closed up, it is filled, for example, through a feed tube 20, with the medium to be filtered, which may, for example, be a turbid liquid. This is done under the necessary working pressure, in the case of a high-pressure filter. The filtered, clear liquid is carried out through the tube 18. If the filter is a vacuum filter, vacuum pumping can be done through the tube 18 until the required vacuum has been produced.

As in all such filtering apparatus, a filter cake forms on the surface of filter 17 which is composed of the solid separated from the turbid liquid and whose thickness constantly increases. When the required thickness is attained, the turbid liquid is first drained out, if desired, through the outlet 21, and the electromagnets 10, or other vibration generators in their stead, are excited at an appropriate frequency. The oscillations are transmitted through the rod 8 to the bottom end of pipe 6, and from there to the tube 12 connected to the filter plates 11, so that the entire mass formed of these filer plates and the tube performs rotational oscillations with the elastic torsion of pipe 6. By these oscillations, aided by the slight slope of the upper sides of filter plates 11, the filter cakes lying on the plates are flung outward and drop downward in the interstice between the outer margins of the filter plates and the wall of the casing 1.

As a consequence of the reaction forces developing in the production of the rotational oscillations, the entire casing 1, which is mounted on the cushions 3, begins to vibrate, thereby accomplishing the rapid collection of the entire mass of filter cake in the bottom-most portion of the casing 1. The solids collected can be removed through the outlet 21.

There can be disposed on the floor of the casing 1 an additional filter 26 made, for example, of the same filter material and supporting fabric as in the case of the filter plates. It is thereby possible to suck out the residual liquid from the collected filter cake that collects on the floor through an additional outlet 27 before the filter cake is removed through the outlet 21. To prevent the oscillations of the casing from being impeded, elastic intermediate members can be inserted into the feed pipes and outlet pipes, similarly to the elastic intermediate member 19 in tube 18.

The oscillating system has a certain natural frequency which depends on the one hand upon the mass moment of inertia of the entire mass performing the oscillation, and on the other hand on the elastic constant of the pipe 6 in torsion. The mass moment of inertia, however, changes with the loading of the filter plates by the filter cake. The oscillations are expediently excited at a frequency which corresponds as closely as possible to the natural frequency of the oscillating system that is produced when the filter plates are so heavily loaded with filter cake that the latter has to be removed. If the system is excited at a frequency that can be adjusted as desired in order to match it as accurately as possible to the natural frequency, very powerful oscillations of the filter plate stack immediately occur since resonance is produced; the filter cakes are rapidly flung from the filter plates, whereupon, however, the amplitude of oscillation immediately diminishes greatly, since resonance no longer prevails between the exciting vibration and the natural vibration of the oscillation system.

FIG. 4 shows diagrammatically an embodiment in which the filter plates 11 are rigidly affixed to the casing 1 by brackets 28, while the casing 1 is mounted vibratably on the supports 2 by elastic blocks 29. By means of a drive 30, which is indicated only schematically, the entire system can be set into oscillations in which, of course, the filter plates 11 also participate.

Those particulars of construction in the embodiments shown in FIG. 4 and the following figures are the same as those in the embodiment in FIGS. 1 to 3, and are therefore not shown in detail in these figures. In the embodiment in FIG. 4, the tube 18 is unnecessary, since the tube 31 bearing the filter plates can be carried out through the casing cover.

FIG. 5 shows an embodiment in which the filter plates 11 inside of the rigidly mounted vessel 1 are fastened to a shaft 33 which is rotatably mounted in bearing 34 and 35. Here again, however, the filter plates do not perform any rotatory movement, and instead, the vibratory oscillations are produced in the form of forced vibrations by means of a lever 36, which engages the periphery of the filter plate stack 11 and is passed through the casing wall through a membrane 37. The vibratory drive of lever 36 is indicated schematically at 38.

FIG. 6 shows diagrammatically an embodiment in which the filter plate stack, which again consists of filter plates 11, and the casing 1 perform contrary oscillations. To this end, the casing 1 is mounted pivotingly in bearings 40 and 41 and is set into rotational oscillations by a drive 42 which is shown only schematically; in this case, if no elastic restoring force is provided, these oscillations are forced oscillations. However, an elastic restoring force can be provided and the vessel can be excited to oscillations at a frequency resulting from the restoring force and the torque. The filter plate stack 11 is connected to the casing 1 by elastic torsion bars 43 and 44. If the rate of rotation at which the casing is set into oscillations is at least approximately the same as the rate of rotations resulting from the elastic torsion force of rods 43 and 44 and the torque of the filter stack 11, the filter stack 11 will perform oscillations which are contrary in sense to the oscillations of casing 1. Inlets and outlets can again be provided in a manner similar to the embodiment of FIGS. 1 to 3.

In the practical creation of a filter apparatus according to the invention, the filter plates may have, for example, a diameter of 1150 mm., and 30 filter plates are combined into a stack. In this case, a filter area of about 30 m.$^2$ is obtained. Depending upon the viscosity of the liquid to be filtered, the filter output amounts to about 0.5 to 5 m.$^3$/m.$^2$/h., resulting in a filter output of 15 to 150 m.$^3$/h. for the entire filter apparatus.

The apparatus according to the invention can be used, of course, not only for filtering turbid liquids, but also for the filtering of gases. The stated dimensions and other numerical data are examples by which the invention is not to be limited.

What is claimed is:

1. Filtering apparatus comprising a casing; at least one filter plate disposed therein; inlet means sealingly passing through said casing; outlet means sealingly passing through said casing into operative association with said filter plate; and means for rotationally oscillating said filter plate in the plane of said filter plate about an axis perpendicular to said plane in such manner as to maintain said outlet means-casing sealing relationship.

2. Filtering apparatus as claimed in claim 1, wherein said filter plate is connected to said casing through a resilient member.

3. Filtering apparatus as claimed in claim 2, wherein said resilient member is a metal pipe connected at one end to said filter plate and at the other end to said casing.

4. Filtering apparatus as claimed in claim 1, wherein a multiplicity of filter plates is provided joined in a substantially rigid stack.

5. Filtering apparatus as claimed in claim 3, including a rod disposed in said pipe adapted to transmit rotational oscillations.

6. Filtering apparatus as claimed in claim 1, wherein said filter plate is fixed to said casing, and this entire assembly is vibratable.

7. Filtering apparatus as claimed in claim 1, wherein said filter plate and said casing are adapted to be oscillated in resonance.

8. Filtering apparatus as claimed in claim 1, wherein said outlet means has a flexible joint therein adapted to separate casing and filter plate oscillations.

9. Filtering apparatus as claimed in claim 1, wherein said filter plates are conically shaped.

10. Filtering apparatus as claimed in claim 2, wherein said plates and said casing are adapted to be jointly oscillated.

11. Process of filtering which comprises feeding a filtrable fluid mass into the apparatus claimed in claim 1; applying a pressure differential across said filter plate, whereby solids are built up on said plate; and subjecting said filter plate to rotational oscillation sufficient to dislodge said solids from said plate.

12. Process as claimed in claim 11, wherein said fluid is liquid.

13. Process as claimed in claim 11, wherein said solids are dislodged intermittently.

14. Process as claimed in claim 11, wherein said rotational oscillation is induced mechanically.

15. Process as claimed in claim 11, wherein said rotational oscillation is induced electromagnetically.

16. Process as claimed in claim 11, wherein fluid in said dislodged solids is removed prior to recovery thereof.

17. Process as claimed in claim 11, wherein said plate and said casing are oscillated in resonance.

18. Process as claimed in claim 17, wherein said resonance is present only when said plate has solids built up thereon.

References Cited

UNITED STATES PATENTS

| | | | |
|---|---|---|---|
| 726,172 | 4/1903 | Korab | 209—315 |
| 971,013 | 9/1910 | Smith | 210—388 X |
| 2,542,587 | 2/1951 | Smith | 210—388 X |
| 2,737,300 | 3/1956 | Kracklauer | 210—347 X |
| 3,195,729 | 7/1965 | Kracklauer et al. | 210—388 X |
| 3,212,643 | 10/1965 | Schmidt et al. | 210—388 X |

SAMIH N. ZAHARNA, Primary Examiner

U.S. Cl. X.R.

210—79, 332, 347, 388